UNITED STATES PATENT OFFICE.

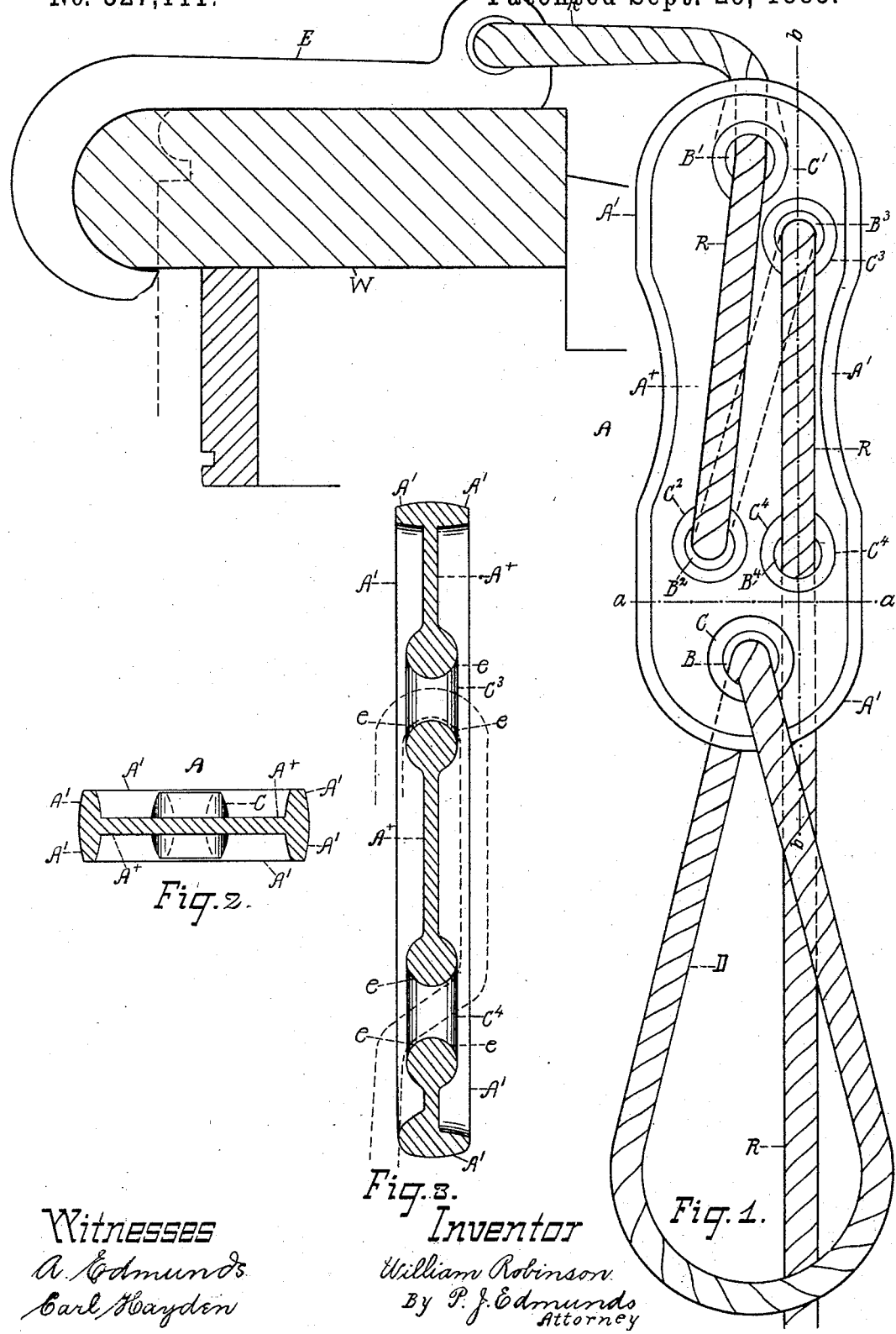

WILLIAM ROBINSON, OF LONDON, ONTARIO, CANADA.

FIRE-ESCAPE.

SPECIFICATION forming part of Letters Patent No. 327,111, dated September 29, 1885.

Application filed February 12, 1883. (No model.) Patented in Canada February 26, 1883, No. 16,386.

*To all whom it may concern:*

Be it known that I, WILLIAM ROBINSON, provincial land surveyor, a subject of the Queen of Great Britain and a resident of the city of London, in the county of Middlesex, in the Province of Ontario, Canada, have invented a new and useful Friction Metallic Fire-Escape, of which the following is a specification.

My invention relates to those friction fire-escapes in which a brake or block provided with openings for the passage of the rope is employed; and my improvement consists in features of novelty hereinafter described, and pointed out in the claims.

The construction and operation will be more particularly explained with reference to the accompanying drawings, wherein Figure 1 is a front elevation of my invention shown secured to the window-board. Fig. 2 is a cross-sectional view of the brake on the line $a\,a$, Fig. 1. Fig. 3 is a longitudinal section of same on the line $b\,b$, Fig. 1, showing the construction of the ring-flanges through which the lowering-rope passes.

A designates a brake, preferably constructed in the shape shown in Fig. 1 of annexed drawings; but it may be constructed of any suitable size or shape and of malleable iron, cast-iron, or any other suitable material.

A′ designates a flange extending all around the edge of the flat body A$^×$, which flange A′ projects outward from both faces of the flat body A$^×$, as shown particularly in Fig. 2 of annexed drawings.

By constructing the brake A with the flange A′ it makes the brake A very strong and durable while only using a small quantity of material in its construction, thereby rendering it possible to make the brake A very light, so that the brake A with the lowering-rope R and bridle-rope D, included, would only occupy a very small space in a valise, in which it might be carried around by a person when traveling. This flange A′ also prevents the lowering-rope R from being grasped too tightly between the hand and body A$^×$, which, if said lowering-rope R, passing in and out of the holes B′ B$^2$ B$^3$ B$^4$, were grasped tightly, between the hand and the face of the brake A, it would prevent the brake A from sliding down on the rope R, thereby preventing the descent of the persons wishing to lower themselves, as nervous persons might do in their fear of falling off.

B B′ B$^2$ B$^3$ B$^4$ are holes cut through this brake A, which are provided with ring-flanges C C′ C$^2$ C$^3$ C$^4$ around them, which ring-flanges extend outward from both faces of the brake A about the same distance as the flange A′, and are rounded in their longitudinal section and are cut away, as shown at $e\,e$, and rounded a short depth under the straight part of the lowering rope R.

Through the holes B′ B$^2$ B$^3$ B$^4$ the lowering-rope R passes in and out, the ring-flanges C′ C$^2$ C$^3$ C$^4$ around these holes being for the purpose of lessening the friction of the lowering-rope R passing through them, as well as to prevent the wear of the said lowering-rope R.

D is a bridle, one end of which is passed through the hole B. The ends are then spliced, thereby safely securing the bridle D to the brake A. This hole B is provided with a ring-flange, C, around it, similar to the flanges C′ C$^2$ C$^3$ C$^4$, and for a similar purpose.

To the upper end of the lowering-rope R a hook, E, is securely connected, which safely secures the upper end of the lowering-rope R to the window-board W.

The operation of descending is as follows: If a person wishes to escape from a building, he puts the bridle D over his head, around his back, and under his arms, in such a position as to have the brake A in front of him. He then catches the hook E on the inner edge of the window-board W, as shown in Fig. 1 of annexed drawings. He then grasps the brake A with one hand or allows himself to swing in the bridle D and safely lets himself out of the window. He may then catch hold of the rope R with one or both hands, but one is sufficient, without any fear of falling, as he has the bridle D around his back and under his arms, which retains him in an upright and easy position when descending, which would give a person confidence and thereby expedite the descent.

The lowering-rope R is stationary, and the brake A slides down to the ground on the lowering-rope R and with it the person wishing to descend. On the lower end of the rope R a knot is formed to prevent the brake A from becoming detached from the lowering-rope R. The friction of this lowering-rope R passing in and out of the holes B' B² B³ B⁴, as shown in Fig. 1 of annexed drawings, allows the brake A to slide gradually down on it; but if a person wishes to lower himself more slowly or even stop himself if required, he could do so by grasping the lowering-rope R more tightly; and if a person in a building were to secure an unconscious person, invalid, or child in the bridle D it would be impossible for them to fall out, and the descent could be regulated by a person controlling the rope R, on the ground or in the window where the person is escaping from.

Having thus described my invention, I claim—

1. A brake or block, A, for friction fire-escapes, formed integral with flat body A$^\times$, flange A', surrounding the flat body, holes B B' B² B³ B⁴, and cut-away flanges C $e$, C' $e$, C² $e$, C³ $e$, C⁴ $e$, surrounding the holes, the flanges around the body and holes preventing the rope from being too tightly pressed on the body, substantially as set forth.

2. A brake, A, constructed with a flat body, A$^\times$, flange A', and holes B B' B² B³ B⁴, provided with ring-flanges C C' C² C³ C⁴, bridle-rope D, lowering-rope R, and hook E, constructed substantially as shown and described, and for the purpose specified.

In testimony whereof I affix my signature in the presence of the two undersigned witnesses.

WILLIAM ROBINSON.

Witnesses:
P. J. EDMUNDS,
A. EDMUNDS.